Patented Oct. 23, 1923.

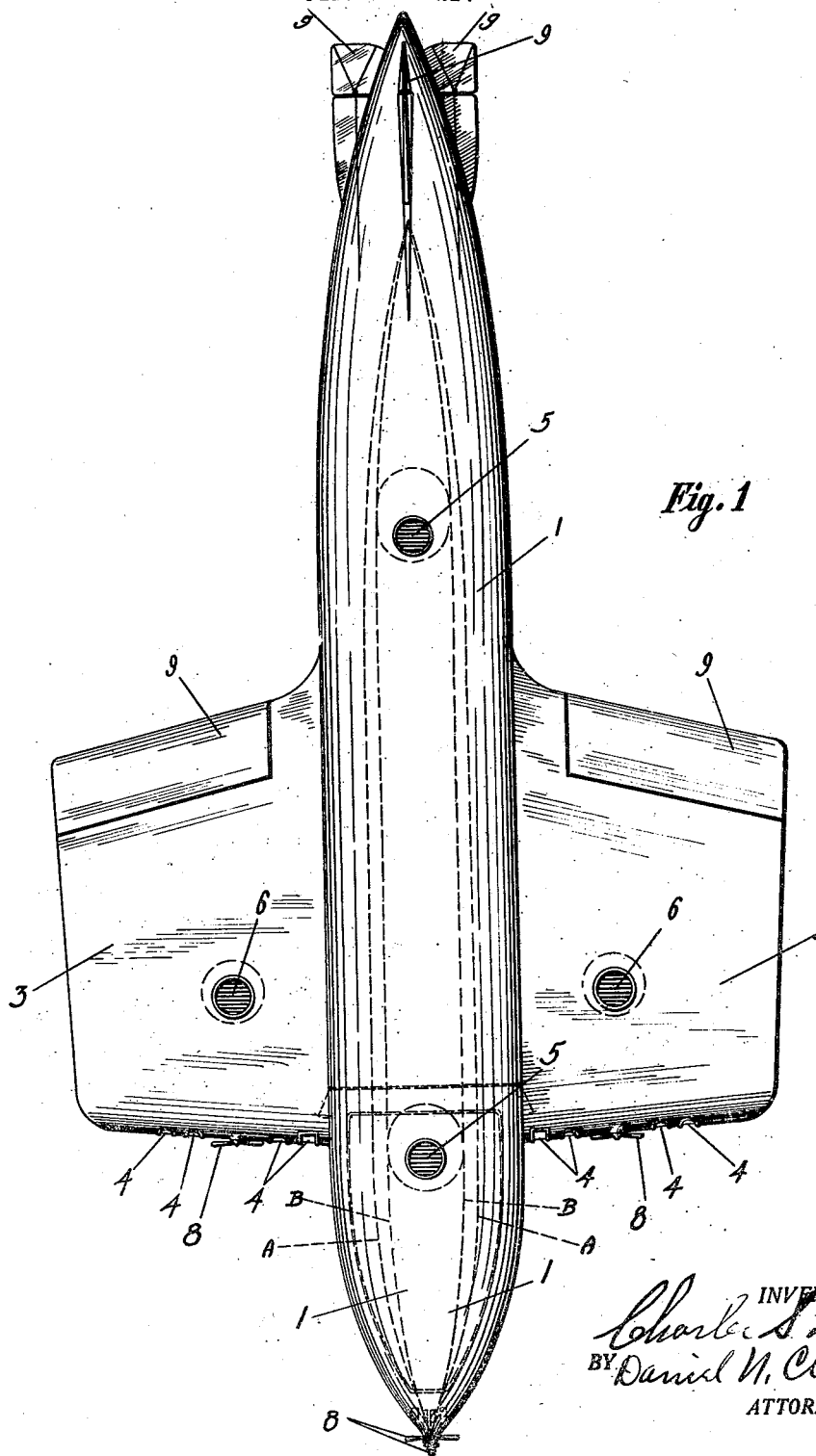

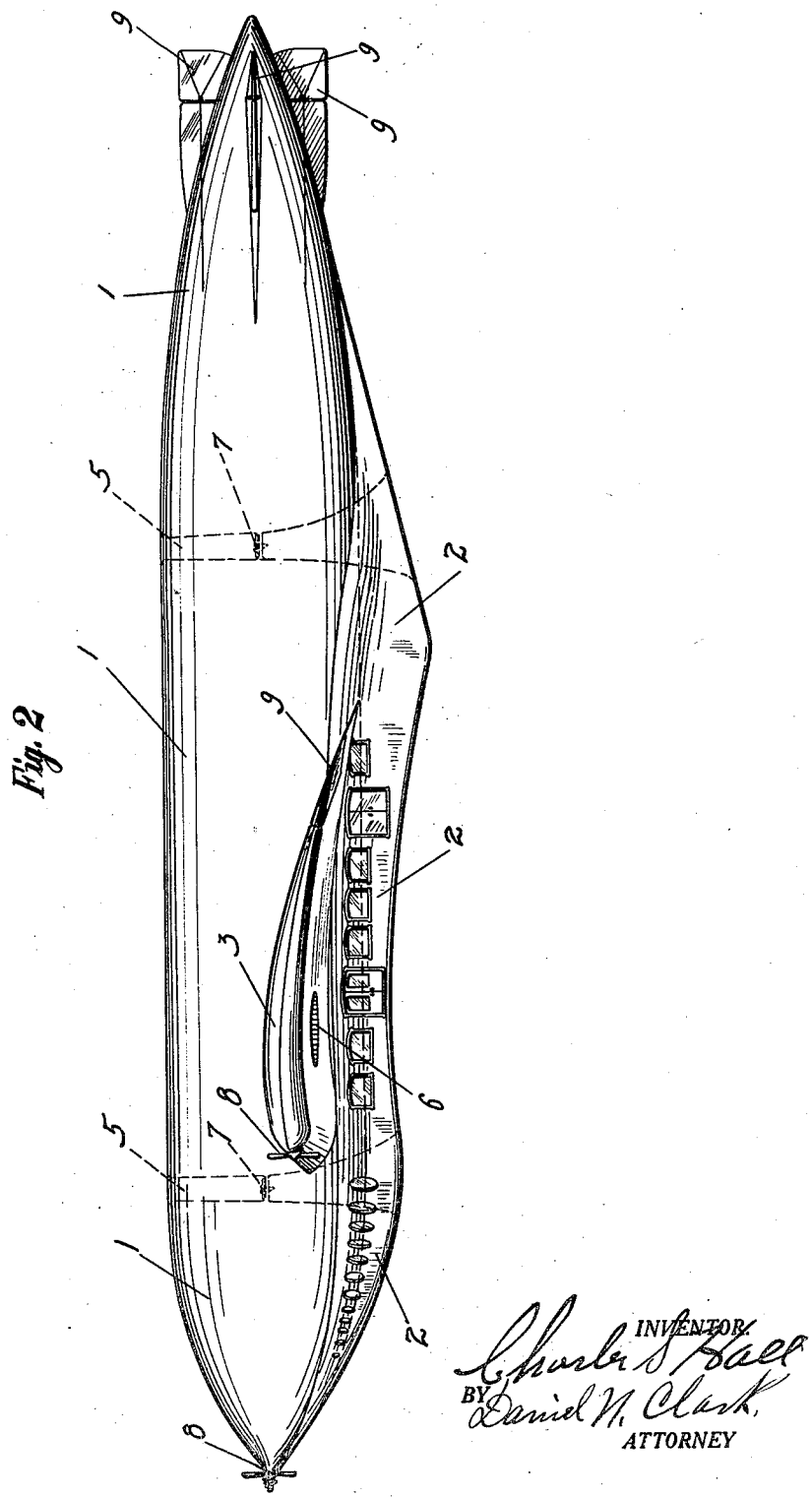

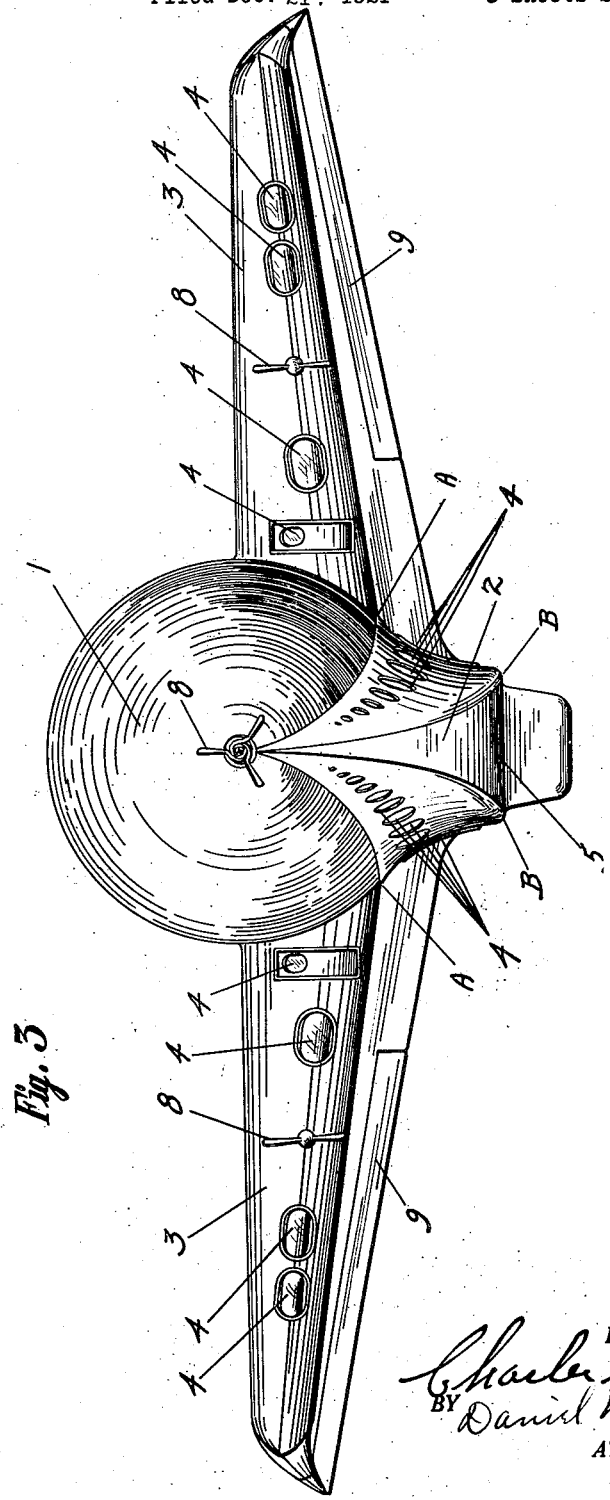

1,471,656

UNITED STATES PATENT OFFICE.

CHARLES S. HALL, OF LOS ANGELES, CALIFORNIA.

AIRCRAFT.

Application filed December 21, 1921. Serial No. 524,007.

*To all whom it may concern:*

Be it known that I, CHARLES S. HALL, a citizen of the United States of America, a resident of Los Angeles, in the county of Los Angeles, State of California, have invented a new and useful Improvement in Aircraft, of which the following, when read with reference to the accompanying drawings, is such a full, clear, and exact specification embodying the invention in its preferred form as will enable others skilled in the art to which it appertains to make and use the same.

My invention relates to an improvement in aircraft and has for one of its objects to provide a buoyancy which, when augmented by the lifting effects produced by the use of engine power operatively arranged with lifting propellers encased, and centrally located and rotated within tubes provided therein, will enable the aircraft to take the air without the necessity of a running contact with the ground.

Another object of my invention is to secure the greatest carrying capacity by providing a centrally located gas container having wings, or planes, built thereon extending outwardly from both sides thereof whereby the wings will produce a lifting effect when the aircraft is in forward motion through the air and will be sufficient to maintain the aircraft in forward and horizontal flight without the direct use of the engine power for the purpose of rotating the said lifting propellers within the tubes provided therein, and thereby permitting the diversion of the said engine power from direct lifting purposes to that of forward propulsion.

Another object is to secure great carrying capacity and at the same time to provide an easy, slow and safe, means of ascending and descending, and also provide a means of lateral strength to the aircraft as a whole by the placement of planes on both sides thereof affording a wide range of internal bracing construction of the said craft so as to withstand the vibrations, jars and undulations, incident to flight and to atmospheric disturbances and resistances.

Another object is to afford a means of maintaining the aircraft in flight with an engine of moderate horse-power and of relatively low piston speed, which will add greatly to the efficiency and effectiveness of the engine power and at the same time increase the life of the engine by reason of such low piston speed and make possible the operative arrangement therewith of large and efficient propellers and affording the use of steam instead of internal combustion engines.

Having thus enumerated some of the objects of my invention, I will now describe the same with reference to the accompanying drawings and the indicating numerals found thereon, all of which form an essential part of this specification.

Figure 1, is a plan view taken from a position above the aircraft showing the general arrangement of the wings upon the central part of the body and the gas container.

Figure 2, is an enlarged side elevational view of the aircraft, while Figure 3 is also an enlarged front elevational view of the same.

In carrying out my invention in its preferred form a torpedo-shaped gas container 1 as shown in all figures, is provided. To this gas container there is depended a body 2 as outlined by dotted lines "A" and "B" shown in Figure 1, and in side view in Figure 2 and front view in Figure 3. On both sides of this gas container 1 are constructed planes or wings 3 as shown in plan view in Figure 1 and in side view in Figure 2 and in front view Figure 3.

In body 2 and wings 3 suitable openings, both doors and windows, 4, are provided. Tubes 5, shown in all figures, are provided passing through both the gas container 1 and body 2, as shown in dotted lines in Figure 2. In wings 3, tubes 6 are provided. Within tubes 5 and 6 suitable lifting propellers 7 are centrally located and rotatably mounted therein and operatively arranged with engines by any suitable means not here shown. Suitable propellers 8 are rotatably mounted upon the aircraft as shown in all figures and operatively arranged with engines by any suitable means so as to propel the aircraft in horizontal direction, in flight. Suitable ailerons, rudders and elevators, 9, as shown in all figures, are provided, operatively arranged by suitable controls not here shown.

Now it will be seen that in operation as the gas container is filled with any suitable lighter-than-air element or fluid the specific weight of the aircraft as a whole is thereby reduced proportionately whereby tending to lift the aircraft from the ground. When the said weight is so reduced, though the aircraft may not be lifted from the ground alone by the buoyancy provided by the gas container, yet when the lifting propeller 7 may be rotated by engine power, thus inducing a downward rush of air through the tubes 5 and 6 with the result that the aircraft will be thus lifted from the ground by the combined lifting effects of the gas container and the said lifting propellers. As elevation is reached, the engine power may be diverted from the lifting propellers 7 and utilized by suitable means not here shown, for the purpose of rotating propellers 8 thereby driving the aircraft in flight in a horizontal direction through the air, at which time the lifting propellers may be stopped since the forward flight will, by reason of the aeriformous effects produced by the wings 3, afford sufficient lifting force to enable the aircraft, as a whole, to maintain its elevation and forward velocity.

When a landing is made propellers 8 may be gradually stopped and propellers 7 may be gradually started by suitable controls whereby the rapidity of descent as well as the direction thereof through the usual controls may be governed and a landing made.

It will of course be understood that various changes can be made in the shape, size, design, arrangement and number, of the parts and combinations of parts herein shown as well as in the collocation thereof without departing from the spirit of my invention.

Having thus described my invention in its preferred form what I claim and for which I desire to secure Letters Patent are as follows:

1. In an aircraft the combination of a gas container, wings arranged thereon, vertically disposed tubes constructed through the said container, propellers operatively mounted within the said tubes, tubes constructed within the said wings with propellers mounted therein.

2. In an aircraft the combination of a gas container having wings laterally built thereon, tubes vertically disposed within the said container with propellers operatively mounted within the said tubes for the purpose of inducing a downwardly disposed current of air therethrough, and tubes constructed within the said wings with propellers operatively mounted therein for the purpose of inducing a downwardly disposed current of air therethrough.

3. In an aircraft, the combination, a gas containing body having wings laterally built thereon, ailerons attached to the aircraft, rudders and elevators attached thereto, vertically disposed tubes arranged within the gas-body and in the wings thereof having lifting propellers operatively mounted therein.

In testimony whereof I have signed my name to this specification.

CHARLES S. HALL.